United States Patent [19]
Parish

[11] Patent Number: 5,979,568
[45] Date of Patent: Nov. 9, 1999

[54] AGRICULTURAL SWEEP HAVING REINFORCING RIDGE

[75] Inventor: Alan F. Parish, Regina, Canada

[73] Assignee: Ralph McKay Industries Inc., Regina, Canada

[21] Appl. No.: 09/158,757

[22] Filed: Sep. 23, 1998

[51] Int. Cl.[6] ............................ A01B 15/00; A01B 35/20; A01B 39/20
[52] U.S. Cl. ......................... 172/724; 172/730; 172/771; D15/28
[58] Field of Search ...................... 172/724, 730, 172/771, 749, 723, 722, 721, 725, 732, 733, 770, 699; D15/29, 11, 28

[56] References Cited

U.S. PATENT DOCUMENTS

| | | | |
|---|---|---|---|
| 152,510 | 6/1874 | Phillips | 172/724 |
| 173,014 | 2/1876 | Jennings | 172/724 |
| D. 277,862 | 3/1985 | Johnson et al. | D15/29 |
| 1,084,153 | 1/1914 | Lauer | 172/724 |
| 1,255,442 | 2/1918 | Lawford | 172/724 |
| 1,636,936 | 7/1927 | Griggs | 172/730 |
| 4,185,699 | 1/1980 | Lewison | 172/724 |
| 4,538,689 | 9/1985 | Dietrich, Sr. | 172/724 X |
| 4,580,639 | 4/1986 | Johnson | 172/730 |
| 4,697,646 | 10/1987 | Johnson et al. | 172/730 |
| 5,172,770 | 12/1992 | Moyle | 172/724 X |
| 5,465,796 | 11/1995 | Buescher et al. | 172/730 X |
| 5,531,277 | 7/1996 | Noonan et al. | 172/724 X |
| 5,558,165 | 9/1996 | Bucher et al. | 172/721 |
| 5,711,378 | 1/1998 | Yeager | 172/730 |

FOREIGN PATENT DOCUMENTS

| | | | |
|---|---|---|---|
| 1189380 | 6/1985 | Canada . | |
| 1192074 | 8/1985 | Canada . | |
| 1493122 | 7/1989 | U.S.S.R. | 172/724 |

*Primary Examiner*—Christopher J. Novosad
*Attorney, Agent, or Firm*—Caesar, Rivise, Bernstein, Cohen & Pokotilow, Ltd.

[57] ABSTRACT

An agricultural sweep has an upwardly extending stem adapted to be secured to a tine of an agricultural implement and a ground breaking member comprised of a pair of substantially planar wings diverging rearwardly from a tip. In order to prevent bending or breaking of the sweep, a reinforcing ridge is provided at the juncture of the wings and the stem, the ridge extending along a longitudinal axis of the sweep from the upper surface of the wings to a point on the stem between the base and the upper end of the stem.

7 Claims, 3 Drawing Sheets

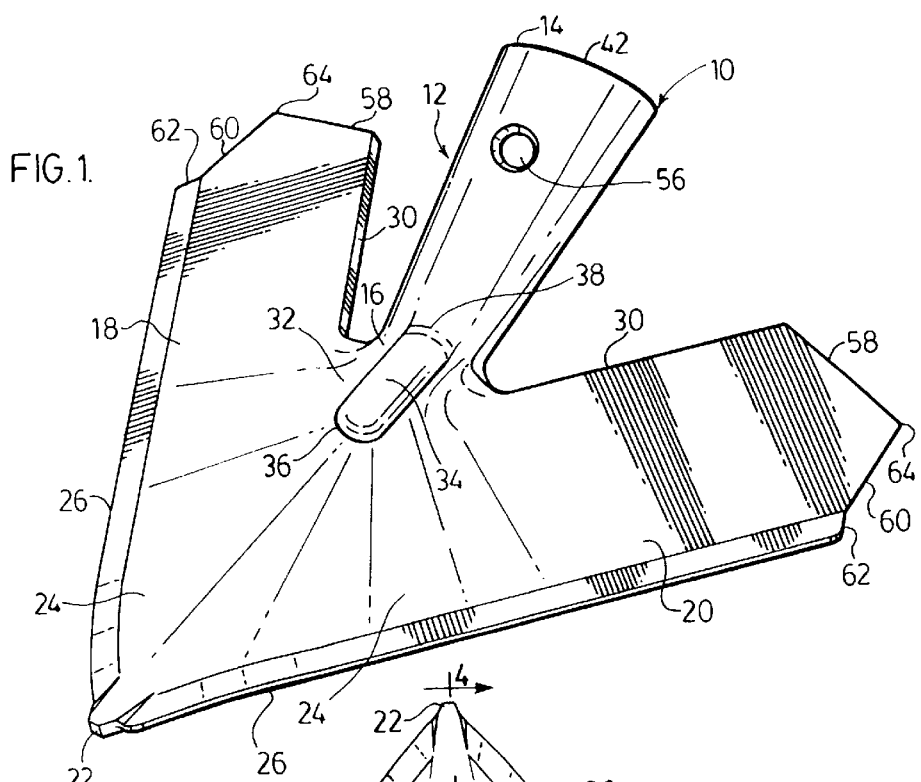
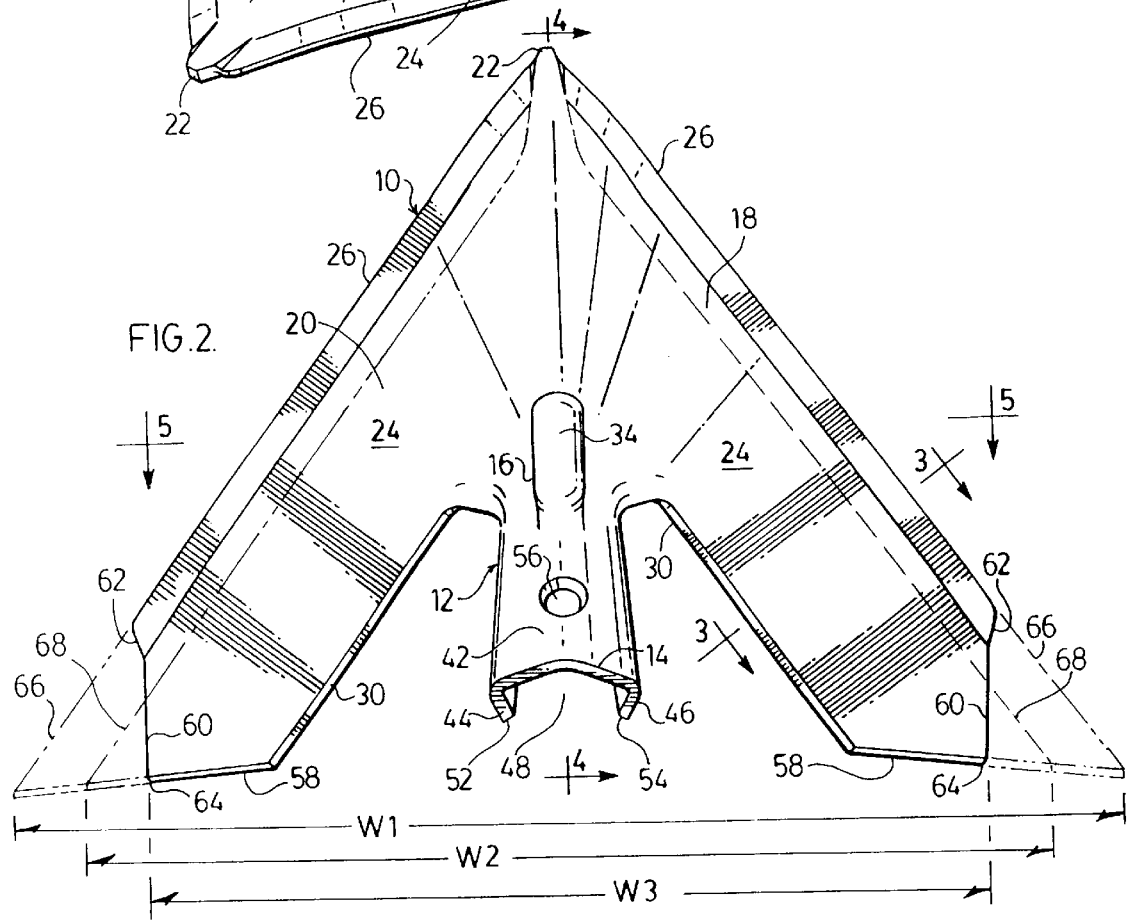

AGRICULTURAL SWEEP HAVING REINFORCING RIDGE

FIELD OF THE INVENTION

The invention relates to sweeps for agricultural tillage implements.

BACKGROUND OF THE INVENTION

Agricultural sweeps are employed as tools in cultivating soil. They typically comprise a stem portion by which they are removably mounted on the lower end of a tine of an agricultural tillage implement, and an earthworking portion attached to the stem which is pulled through the soil to eliminate weeds. The earthworking portion typically has an arrowhead shape and comprises a pair of symmetrical wing elements extending rearwardly from a point. As a result of their use, sweeps are subject to wear and considerable stress, and are particularly prone to bending or breaking at the transition between the stem and the earthworking portion.

This problem has received only cursory consideration in the prior art. For example, Canadian Patent No. 1,189,380 describes an agricultural sweep in which strength is provided at the transition between the stem and the earthworking portion by maintaining the gauge of the metal at the transition and by providing stem side walls which extend continuously through the transition region and form downwardly turned flanges at the upper, trailing edges of the wings.

However, it is desirable that the junction of the stem and the wings be further strengthened in order to further reduce the incidence of bending or breakage at the transition between the stem and earthworking portion of the sweep. Such strengthening would extend the life of individual sweeps, maintain proper sweep angle to thereby reduce energy consumption, and permit the use of wider sweeps to thereby reduce the number of sweeps which must be mounted on the implement.

SUMMARY OF THE INVENTION

The object of the present invention is to provide an improved agricultural sweep which avoids the above-noted and other disadvantages of known agricultural sweeps.

To this end, there is provided in accordance with the present invention an agricultural sweep, comprising: an upwardly extending stem member adapted to be secured to a tine of an agricultural implement, the stem member having an upper end and a base end; and a ground breaking member depending from the base end of the stem member; the ground breaking member comprising a pair of substantially planar wing elements arranged symmetrically about a longitudinal axis, the wing elements extending rearwardly from a point and having continuous upper surfaces; each of the wing elements having a lower leading cutting edge diverging outwardly and rearwardly from the point to a rear end; an upper edge trailing the lower edge and diverging rearwardly and outwardly from the base of the stem; and a reinforcing ridge provided at a transition between the stem and the ground breaking member, with the ridge extending along the axis from the upper surfaces of the wings to a point on the stem between the base end and the upper end.

BRIEF DESCRIPTION OF THE DRAWINGS

The invention will now be more fully described, by way of example only, with reference to the accompanying drawings, in which:

FIG. 1 is a top perspective view of an agricultural sweep in accordance with the present invention;

FIG. 2 is a top plan view of the agricultural sweep shown in FIG. 1;

DETAILED DESCRIPTION OF PREFERRED EMBODIMENTS

Figure 3:
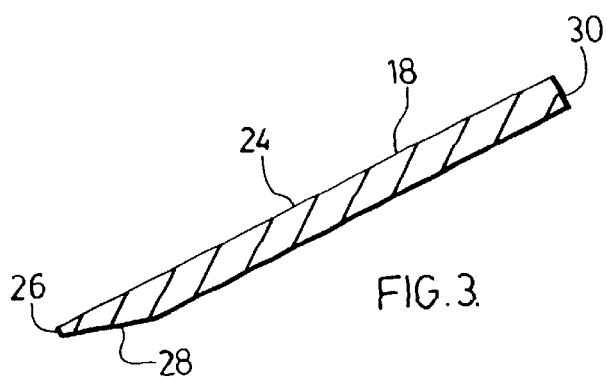
FIG. 3 is a section taken along line 3—3 in FIG. 2.

Referring now to the drawings, FIG. 1 illustrates a preferred agricultural sweep 10 according to the present invention. Sweep 10 is comprised of an upwardly extending stem 12 having an upper end 14 and a base end 16, and a pair of wing elements 18 and 20 which are integrally formed with the stem 12 and with each other. The stem 12 functions to secure the sweep 10 to the lower end of a tine of an agricultural implement (not shown), while the two wing elements 18 and 20 together form a ground breaking member adapted to be pulled through the soil to eliminate weeds.

Wing elements 18 and 20 are mirror images of each other and are symmetrical about the longitudinal axis of the sweep (coincident with line 4—4 in FIG. 2) and together define a generally arrowhead shape having a tip 22. It will be understood that the terms "forward" and "rearward" are used in this specification with reference to the normal direction of travel of the sweep, and the wing elements 18 and 20 extend rearwardly therefrom. Furthermore, since wings 18 and 20 are identical, corresponding elements of each wing element are identified by the same reference numeral.

Figure 6:
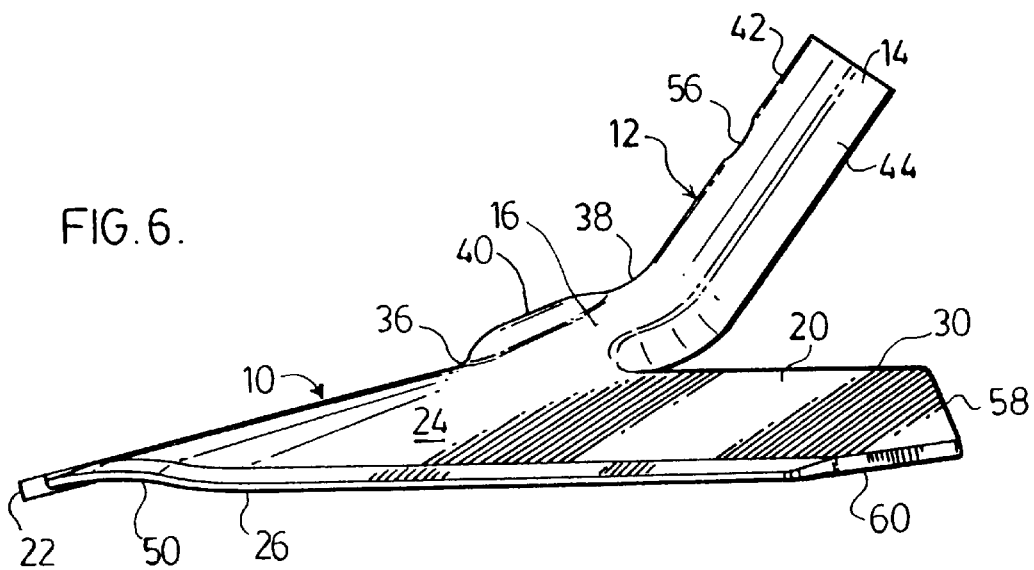
FIG. 6 is a side elevational view of the agricultural sweep shown in FIG. 1.

Each wing element 18, 20 is substantially planar with an upper surface 24 which extends upwardly at an angle in the range of 20° to the horizontal. The lower edge 26 of each wing element 18, 20 is a leading edge diverging outwardly and rearwardly from tip 22, and is chamfered as at 28 to provide a cutting edge of reduced thickness. As shown in the side elevation of FIG. 6, the lower edge 26 of wing element 20 rises slightly toward the front of sweep 10 and falls as it approaches tip 22, thereby forming a slightly convex area 50 rearwardly of tip 22. The upper edge 30 of the wing elements 18, 20 is a trailing edge diverging outwardly and rearwardly from the base 16 of stem 12.

The tip 22 of sweep 10 is blunted for improved wear characteristics and protrudes forwardly from the point at which it joins lower edge 26. In addition, tip 22 has a thickness which is greater than that of chamfered lower edge 26, such that tip 22 forms a ridge on the upper surface 24 of wing elements 18, 20.

Figure 4:
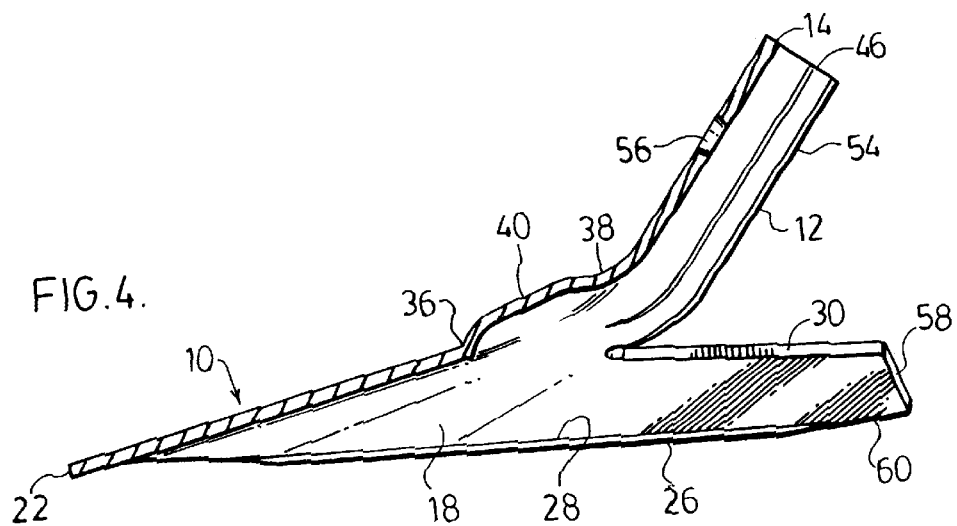
FIG. 4 is a section taken along line 4—4 in FIG. 2.
Figure 5:
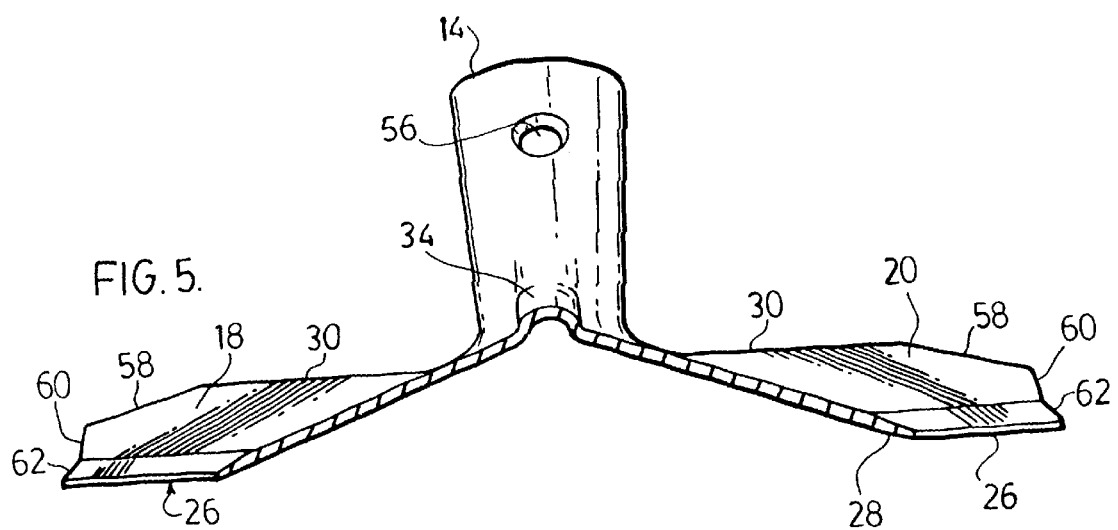
FIG. 5 is a section taken along line 5—5 in FIG. 2.

The stem 12 and the upper surface 24 of wings 18, 20 blend smoothly into one another at a transition area 32 which includes the base end 16 of stem 12 and a portion of the upper surface 24 of wings 18, 20 proximate the base 16. At this transition 32 a reinforcing ridge 34 is provided, ridge 34 extending along the longitudinal axis of the sweep 10 from a point 36 on the upper surface 24 of wings 18, 20 to a point 38 on the stem 12 between the base end 16 and upper end 14. Preferably, points 36 and 38 are proximate base 16 of stem 12. As shown in FIG. 4, ridge 34 has an upwardly convex configuration and rises to a maximum 40 approximately midway between points 36 and 38. Ridge 34 also has an upwardly convex shape when viewed in a plane transverse to the longitudinal axis, as in FIG. 5.

It has been found that the provision of a reinforcement ridge such as 34 on sweep 10 increases the strength of the sweep 10 at the juncture of the stem 12 and the wings 18, 20. Therefore, in practice, the sweeps described herein are less subject to bending and breakage than sweeps known in the prior art and have a longer life than conventional sweeps. This reduces the frequency of sweep changes, thereby improving the efficiency of the farming implement.

Stem 12 has a channel structure with a forwardly convex front wall 42 and two rearwardly directed side walls 44 and 46. Side walls 44, 46 converge toward one another in a rearward direction, and together with front wall 42 define a rearwardly open space 48 which is adapted to receive the lower end of a tine (not shown). The front wall 42 of stem 12 tapers inwardly in a downward direction so that a cross-sectional area of opening 48 is greater at the upper end 14 of stem 12 than at the base end 16. Preferably, stem 12 receives the lower end of the tine in a friction fit, such that stem 12 is not required to be bolted to the tine.

Figure 7:
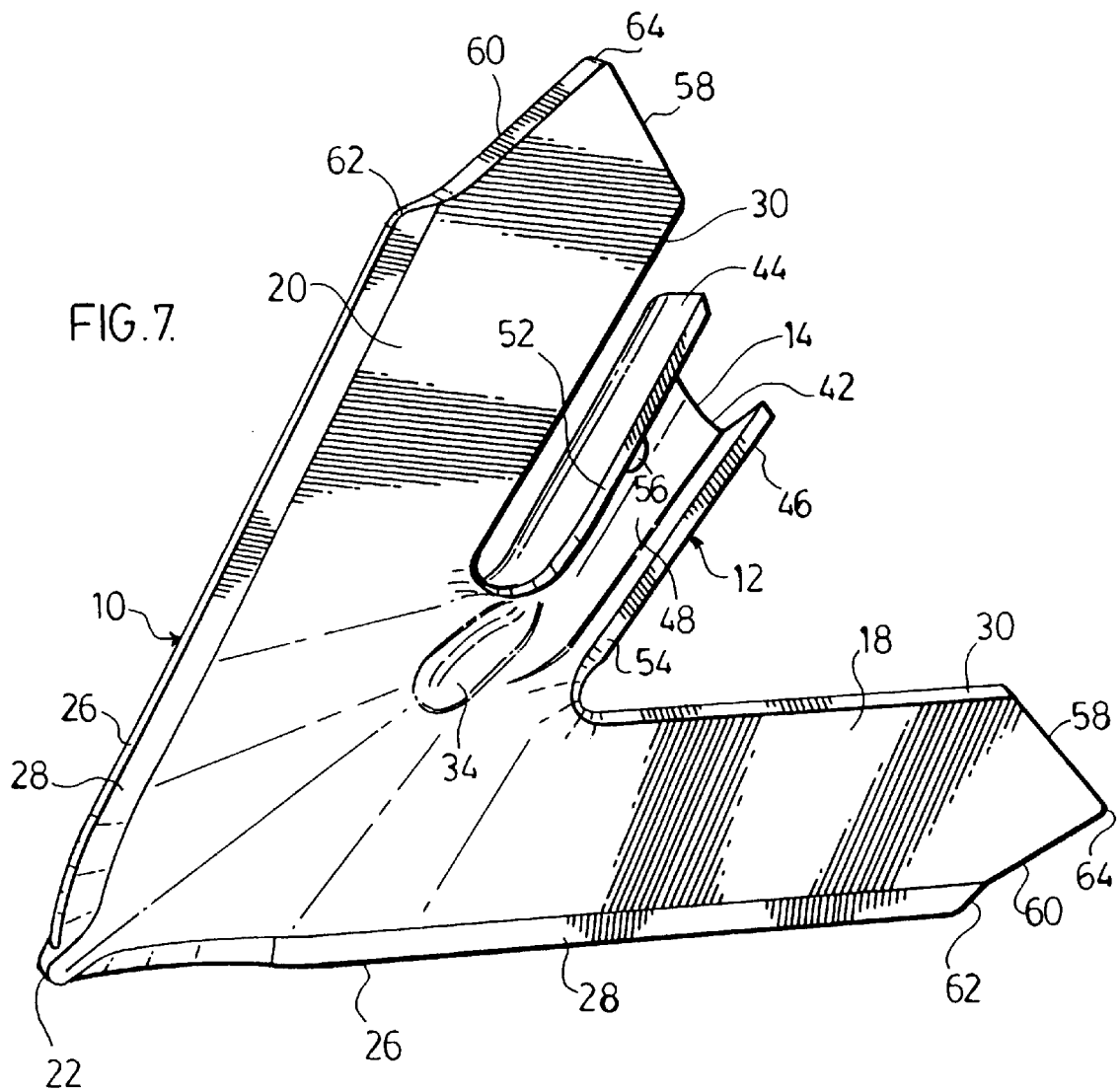
FIG. 7 is a bottom perspective view of the agricultural sweep shown in FIG. 1.

From FIG. 7 it will be apparent that the rearward edges 52 and 54 of respective side walls 44 and 46 of stem 12 are continuations of the upper, trailing edges 30 of wings 18 and 20, which are twisted relative to one another at the base 16 of stem 12.

Stem 12 is optionally provided with an aperture 56 in the front wall 42 of stem 12. It is to be understood that aperture 56 is not required for attachment of sweep 10 to a tine, but rather is provided so that sweep 10 may be hung from a hook, as for example during painting of sweep 10.

As illustrated in FIG. 2, the upper edge 30 of each wing 18, 20 terminates at a first rear edge 58 which is substantially perpendicular to the longitudinal axis, and the lower edge 26 of each wing 18, 20 terminates at a second rear edge 60 which is generally parallel to the longitudinal axis. Rear edges 58 and 60 are substantially straight with the exception that second rear edge 60 has a slight outward protrusion proximate the point of its intersection with lower edge 26. Rear edges 58 and 60 form a substantially right angle at their point of intersection 64, such that each wing 18, 20 has the appearance of having a clipped rear edge.

The provision of clipped edges permits wings 18, 20 to maintain a substantially constant width during the life of sweep 10. Dotted line 66 in FIG. 2 represents the shape of the rear edge of a conventional sweep, which has a width W1 measured between the rear terminal ends of the lower edges. Dotted line 68 represents the wear pattern of an agricultural sweep showing that, after a period of use, the width of the conventional sweep has decreased to width W2. In contrast, the width W3 of sweep 10, measured between points 64 on the respective wings 18, 20, remains substantially constant during the life of the sweep. Maintaining a constant sweep width ensures that the distance between adjacent sweeps on the agricultural implement will remain substantially constant for the life of the sweep. The life of the sweep is thereby effectively extended since the farmer will be faced with fewer sweep changes necessitated by decreasing sweep width.

It will be appreciated that the above object of maintaining a substantially constant sweep width only requires that second rear edge 60 is substantially parallel to the longitudinal axis of sweep 10. This object of the invention may be attained regardless of whether first rear edge 58 is perpendicular to the longitudinal axis, or whether rear edges 58 and 60 meet at 90°.

As shown in the drawings, the metal comprising sweep 10 is of relatively constant gauge, with the exception that the lower edges 26 are forged to provide a cutting edge of reduced thickness. In one preferred example, sweep 10 is formed from metal having a thickness of about 0.25 inch (about 6 mm), with lower edge having a thickness of about 1/16 inch (about 2 mm).

By providing a sweep 10 as described above, sweep life can be substantially extended over that of conventional sweeps. Furthermore, the improved resistance of sweep 10 to stresses at the transition between stem 12 and wings 18, 20 permits the use of sweeps which are substantially wider than those now commonly in use. Conventional sweeps typically have a sweep width, measured as discussed above with reference to FIG. 2, of about 9 inches. However, sweep 10 preferably has a width W3 of up to about 16 inches, more preferably in the range of from about 11 to about 16 inches. The provision of wider sweeps is preferred since the farmer is required to purchase, install and change fewer sweeps, thereby improving his efficiency.

Preferably, each lower edge 26 of sweep 10 has a length in the range of from about 11 to about 15 inches, and each upper edge 30 preferably has a length in the range of from about 4 to about 7 inches. However, it will be appreciated that the lengths of edges 26 and 30 areis dependant on the desired width W3 of sweep 10. The distance along upper surface 24 from lower edge 26 to upper edge 30 is preferably from about 3 to about 4 inches.

Reference is made throughout this application to the stem of the sweep being adapted to be secured to the tine of an agricultural implement. However, it will be appreciated that the sweep is not necessary directly secured to the tine of the implement, but may rather be secured to the tine through an adaptor or a clip.

Although the invention has been described in relation to certain preferred embodiments, it is to be understood that the invention is not restricted thereto. Rather, the invention includes all embodiments winch may fall within the scope of the following claims.

What is claimed is:

1. An agricultural sweep, comprising:

an upwardly extending stem member adapted to be secured to a tine of an agricultural implement, said stem member having an upper end, a base end, a front wall and two rearwardly directed side walls, said front wall and said rearwardly directed side walls defining a space in which an end of said tine is received; and a ground breaking member depending from said base end of said stem member;

said ground breaking member comprising a pair of substantially planar wing elements arranged symmetrically about a longitudinal axis, said wing elements extending rearwardly from a point and having continuous upper surfaces;

each of said wing elements having a lower leading cutting edge diverging outwardly and rearwardly from said point to a rear end;

and upper edge trailing said lower leading cutting edge and diverging rearwardly and outwardly from said base of stem member; and a reinforcing ridge provided at a transition between said stem member and said ground breaking member, with said reinforcing ridge extending along said longitudinal axis from said upper surfaces of said wing elements to a point on said stem member between said base end and said upper end, wherein said reinforcing ridge has an upwardly convex configuration in a plane parallel to said longitudinal axis and a rounded, upwardly convex configuration in a plane perpendicular to said longitudinal axis, said reinforcing ridge having sides which extend parallel to said longitudinal axis and which are located inwardly of the side walls of the stem member.

2. The agricultural sweep is claimed in claim 1, wherein said stem member is adapted to be slid over the end of said tine and secured to said tine by a friction fit, said stem member tapering inwardly in a downward direction.

3. The agricultural sweep as claimed in claim 1, wherein said point on said stem member to which said reinforcing ridge extends is proximate said base end of said stem member.

4. The agricultural sweep as claimed in claim 1, wherein said reinforcing ridge begins at a point on said upper surfaces of said wing elements proximate said base end of said stem member.

5. The agricultural sweep as claimed in claim 1, wherein said upper edge of each of said wing elements terminates at a first rear edge which is substantially perpendicular to said longitudinal axis, and said lower leading cutting edge of each of said wing elements terminates at a second rear edge which is substantially parallel to said longitudinal axis, said first and second rear edges meeting at 90 degrees.

6. The agricultural sweep as claimed in claim 1, wherein said wing elements are downtured proximate said point from which said wing elements extend.

7. The agricultural sweep as claimed in claim 1, wherein said ground breaking member has a forwardly protruding tip at said point from which said wing elements extend, said forwardly protruding tip having a thickness greater than a thickness of said lower leading cutting edges of said wing elements so that said forwardly protruding tip forms a rearwardly extending ridge on said upper surfaces of said wing elements.

* * * * *